A. H. Wood,
Engravers' Tool.
Nº 27,253.   Patented Feb. 21, 1860.

Witnesses.
Joseph Gavett
Albert W. Brown.

Inventor.
A. H. Wood

UNITED STATES PATENT OFFICE.

A. H. WOOD, OF BOSTON, MASSACHUSETTS.

ENGRAVER'S VISE.

Specification of Letters Patent No. 27,253, dated February 21, 1860.

*To all whom it may concern:*

Be it known that I, A. H. WOOD, of Boston, in the county of Suffolk and State of Massachusetts, have invented a new and useful Apparatus or Vise for Engravers' Use and for other Analogous Purposes, and that the following description, taken in connection with the accompanying drawing, hereinafter referred to, forms a full and exact specification of the same, wherein I have set forth the nature and principles of my said invention by which it may be distinguished from all others of a similar class, together with such parts as I claim and desire to have secured to me by Letters Patent.

The figures of the accompanying plate of drawings represent my improvements.

Figure 1:
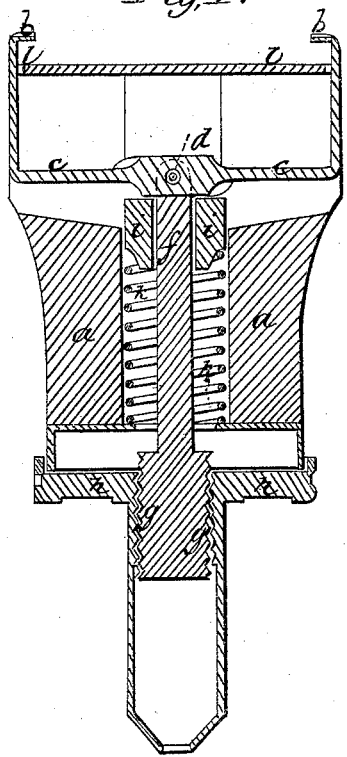
Figure 2:
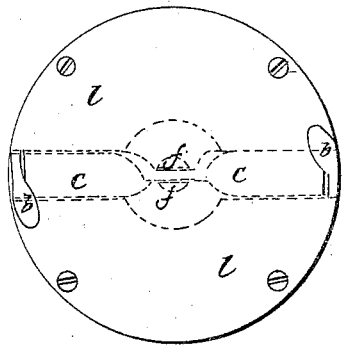

Figure 1 is a central, vertical section. Fig. 2 is a plan or top view.

The object of my invention is to produce such a holding and bearing surface, during the process of engraving and other analogous purposes as not only to firmly grip the outside to be engraved or operated upon but also to allow the said apparatus to yield in some degree, so that the work however irregular in its shape and varying in thickness at its ends, shall be firmly held. This yielding motion which is well known to be essential has usually heretofore been imperfectly secured by the use of a soft cushion or pad, combined with an ordinary unyielding vise or holding apparatus. But in bearing down upon one end of the article to be engraved or ornamented, with the requisite force, the other end, being rigidly held by jaws as aforesaid, would produce the effect of breaking or bending or warping the said article.

To secure the desired results above briefly stated and avoid the objections attendant upon the use of the devices heretofore employed, I have so constructed my new apparatus as to hold the article to be operated upon by means of jaws which are attached to or form a part of a tilting frame turning upon a pivot and bearing upon a suitable spring, the effect being that when a pressure or bearing down is produced upon one end of the article to be engraved the same degree of pressure will be received by the other end, but in an upward and contrary direction, thereby avoiding the danger of bending or warping the work of the operator and at the same time affording an elastic and yielding bearing surface thereto, the apparatus moreover being adapted to holding articles of varying thickness and of irregular forms.

$a\ a\ a$ in the drawings represent a stock or framework composed of any suitable material which may be inserted in any suitable standard.

$b\ b$ are clamps attached to or forming a part of a tilting frame $c\ c$ turning upon a pivot $d$ which also passes through the upper end of a vertical shaft $f\ f$ having cut upon its lower portion a male screw $g$ engaging with the female screw of a turning nut $h\ h$. The tilting frame $c\ c$ rests upon a collar $i$ that bears upon a spiral or other spring $k\ k$ Fig. 1 or it may rest directly upon the spring.

The work to be engraved or ornamented is placed between the clamps $b\ b$ and the top plate or cushion $l\ l$ of the stock $a\ a$, and fastened thereto by turning the nut $h\ h$. Thus it will be seen that the frame $c\ c$ will tilt according to the position in which the pressure is applied and by the action of the spring $k\ k$ thereon, an elastic yielding bearing will be afforded, that is equal and uniform in all directions, thereby preventing the possibility of bending or injuring the work and greatly facilitating the manipulations of the operator. By unscrewing the nut $h\ h$ the tilting frame, by the retracting power of the spring $k\ k$ will be raised to any desired extent and the clamps $b\ b$ will therefore release the article held thereby.

Having thus described my improvements I shall state my claim as follows:

What I claim as my invention and desire to have secured to me by Letters Patent is—

The combination of a proper spring with the tilting frame $c\ c$, operating together in a suitable stock or standard as described and for the purposes specified.

A. H. WOOD.

Witnesses:
JOSEPH GAVETT,
A. W. BROWN.